Nov. 25, 1958  R. W. BEACHLEY  2,862,041
SPLICE FOR ELECTRICAL WIRING
Filed March 16, 1955
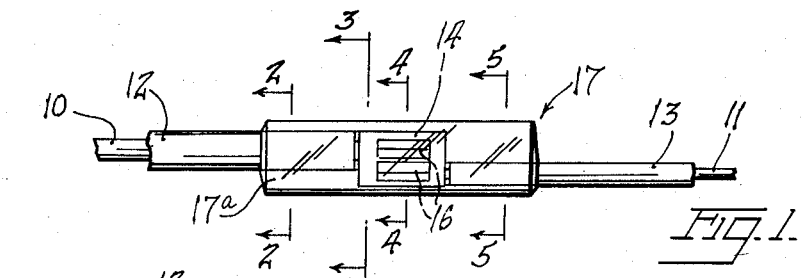
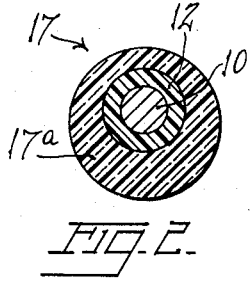 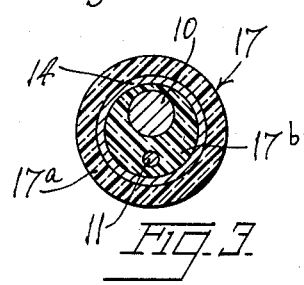 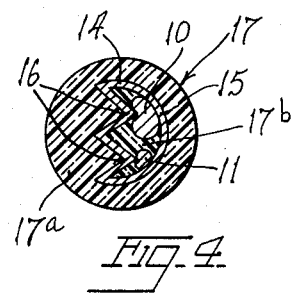
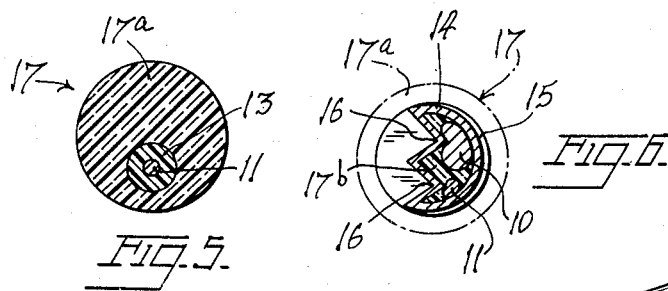
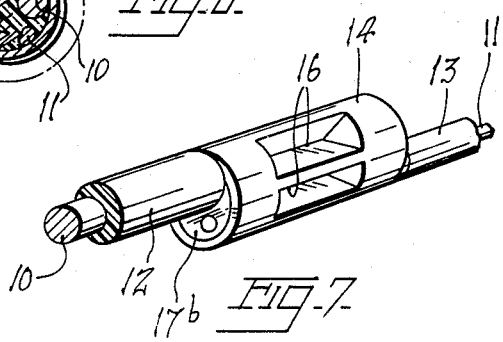
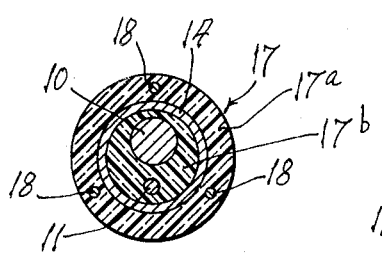
INVENTOR.
ROBERT W. BEACHLEY
BY
*Johns H Beachley*
ATTORNEY

United States Patent Office 2,862,041
Patented Nov. 25, 1958

2,862,041

SPLICE FOR ELECTRICAL WIRING

Robert W. Beachley, Boone, N. C., assignor to Lektro-Thermal Corporation, Boone, N. C., a corporation of North Carolina Application March 16, 1955, Serial No. 494,753

4 Claims. (Cl. 174—84)

This invention relates to a new and improved splice for electrical wiring, particularly insulated wire.

Splicing means for insulated electrical wiring are known which comprise a mechanical connection between the insulated conductors, usually a twisting together of the conductors, and an insulating shield covering said connection. The known splices are satisfactory in some respects but they do not provide a moistureproof barrier between the mechanically connected conductors and the elements, the mechanical connection fails occasionally and interposes a break in the conductor, and the nature of the insulating shield is such that each time a failure of the mechanical connection is suspected the same must be undone to check the connection. Another unsatisfactory feature of the known splices is their bulk and appearance.

The principal object of the invention is to provide a splice which overcomes the shortcomings of prior art splices, which provides a strong mechanical connection between conductors, which provides a hermetically sealed waterproof, insulative shield for said connection extending from the insulation on one conductor to that on the other, and which is transparent to permit viewing of the mechanical connection.

According to the invention the ends of a pair of conductors are secured in opposite ends of a soft metal sleeve which is crimped with a suitable tool to compress it on the conductors. The sleeve and the exposed portions of the conductors are hermetically sealed in a cylinder of transparent plastic material comprising an outer plastic tube and a plastisol filler which fills the voids surrounding the conductors and the sleeve in the tube; sealing of the cylinder being effected by heat welding of the tube and filler.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is an elevational view of the splice of the invention.

Fig. 2 is an enlarged sectional view on line 2—2 of Fig. 1.

Fig. 3 is an enlarged sectional view on line 3—3 of Fig. 1.

Fig. 4 is an enlarged sectional view on line 4—4 of Fig. 1.

Fig. 5 is an enlarged sectional view on line 5—5 of Fig. 1.

Fig. 6 is a sectional view similar to Fig. 4 but with a part removed to illustrate the construction therebehind.

Fig. 7 is an isometric view of a subassembly of the splice of the invention.

Fig. 8 is an elevational view similar to Fig. 1, illustrating a modified form of the invention.

Fig. 9 is a sectional view on line 9—9 of Fig. 8.

Referring to Fig. 1, a pair of conductors 10 and 11 having insulative sheaths 12 and 13 of vinyl or other plastic material, are spliced together by the means of the invention. As shown, the conductors 10 and 11 are of different sizes, but it will be understood that they may be of the same size if desired.

The sheath of the invention comprises a soft metal sleeves 14, see also Figs. 3, 4, 6 and 7, into opposite ends of which protruding ends of the conductors 10 and 11 are inserted. The sleeve 14 is crimped centrally thereof by any suitable means, the crimping compressing the periphery of the sleeve concentrically inwardly throughout an angle of approximately 180° indicated at 15 and forming a pair of deep, V-shaped indentations 16 extending longitudinally in the opposite hemisphere of the sleeve. As best shown in Figs. 4 and 6 the inner surfaces of the indentations 16 dig into the conductors 10 and 11 which are further deformed by the compressed portion 15 of the sleeve.

The construction thus far described is such that the ends of the conductors 10 and 11 are securely fixed in the crimped sleeve 14 which joins them mechanically and electrically.

The sleeve 14 and the exposed ends of the conductors 10 and 11 are imbedded in an improved cylinder 17 of transparent plastic material hermetically sealed to the plastic insulating sheaths 12 and 13 by heat, see Figs. 2 and 5. The length and thickness of the cylinder 17 are dependent on the individual user's requirements and may be selected accordingly.

According to the invention, the cylinder 17 comprises an outer plastic tube 17a and a plastisol filler 17b which occupies all of the voids surounding the conductors 10 and 11 and the sleeve 14. The tube and the filler are welded together to form an integral, hermetically sealed unit by application of heat thereto in a suitable welding process. Any suitable transparent plastic materials may be utilized for the tube and the filler provided that a solid, integral, fused bond is made between the tube and filler. Before the bond is made by application of heat, the plastisol in the fluid form of a polyvinyl chloride resin dispersed in a liquid plasticizer. Upon application of sufficient heat, the plastisol is converted to an elastomeric compound. Since no solvents or diluents are contained in the plastisol, no evaporation of volatile components occurs upon setting of the plastisol. Thus, shrinkage of the filler on setting is avoided and the bond with the outer cylindrical tube is free from pores and cracks. The elastomeric character of the filler provides a resilient semiflexible body to the splice enclosure which is tough durable and shock absorbing. The tube 17a is fused sealed to the plastic sheaths 12 and 13 in the same heat treatment which sets the plastisol filler and fuses the filler to the tube, which is a quick and economical process.

It will be seen, therefore, that the plastic cylinder 17 hermetically seals the connection of the conductors 10 and 11 to protect the same from moisture and at the same time insulates said connection which still remains visible inside its enclosure.

Referring now to Figs. 8 and 9, there is disclosed a modified form of the invention whereby the possibility of damage to the mechanical connection between the conductors due to flexing of the cylinder 17 is eliminated. In so far as applicable, the same reference numerals used in Figs. 1–7 are also used in Figs. 8 and 9. As shown, a trio of stiffening rods 18 are imbedded in the cylinder 17a in equiangular positions. The rods 18 may be made of any suitable material such as steel and are of a length to overlap not only the sleeve 14 but also the exposed ends of the conductors 10 and 11. Thus the cylinder 17ª is stiffened and prevented from flexing except for the ends thereof which imbed the insulated portions of conductors 10 and 11 and failures of the mechanical connection due to such flexing are eliminated.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A splice for a pair of conductors provided with insulative sheaths except for exposed end portions, comprising a soft metal sleeve housing the exposed ends of the conductors and crimped to secure the latter therein, a transparent plastic cylinder in which said exposed ends, said sleeve and the ends of the insulative sheaths are imbedded, and hermetically sealed, the sleeve and the said exposed ends being visible through the cylinder, and a plurality of stiffening rods imbedded in the cylinder to prevent flexing thereof, said rods being located in equiangular positions radially outward of the sleeve and extending longitudinally beyond the ends of the sleeve, the cylinder comprising on outer plastic tube and an elastomeric plastisol filler occupying the voids surrounding the conductors, the sleeve and the stiffening rods, the tube and the filler being integrally fused together.

2. A splice for a pair of overlapped conductors provided, except for exposed end portions, with insulative plastic sheaths, comprising a soft metal sleeve, said exposed ends of the conductors being inserted in the sleeve, portions of said sleeve being crimped upon said ends to form a secure mechanical connection between the conductors, a plastic cylinder in which exposed portions of the conductors and said connection are enclosed, said cylinder comprising a tube integrally and hermetically fused to the insulative sheaths of the conductors forming a hermetic seal around the exposed portions of the conductors and said connection, and an elastomeric plastisol filler occupying the voids surrounding the conductors and the connection within the tube, the tube and filler being integrally fused together.

3. A splice according to claim 2, wherein said cylinder is transparent.

4. A splice according to claim 2, further comprising a plurality of rigid rods longitudinally disposed therein and spaced from the metal sleeve and conductors.

References Cited in the file of this patent

UNITED STATES PATENTS

| | | |
|---|---|---|
| 1,487,937 | Griffin | Mar. 25, 1924 |
| 2,160,313 | Norres | May 30, 1939 |
| 2,426,413 | Pollett | Aug. 26, 1947 |
| 2,466,930 | Cook | Apr. 12, 1949 |
| 2,478,082 | Broske | Aug. 2, 1949 |
| 2,559,795 | Boggs | July 10, 1951 |
| 2,590,821 | Kiser | Mar. 25, 1952 |
| 2,729,695 | Pierce | Jan. 3, 1956 |